June 16, 1942.  C. T. RAY  2,286,872
MOWER
Filed Jan. 11, 1941  3 Sheets-Sheet 1
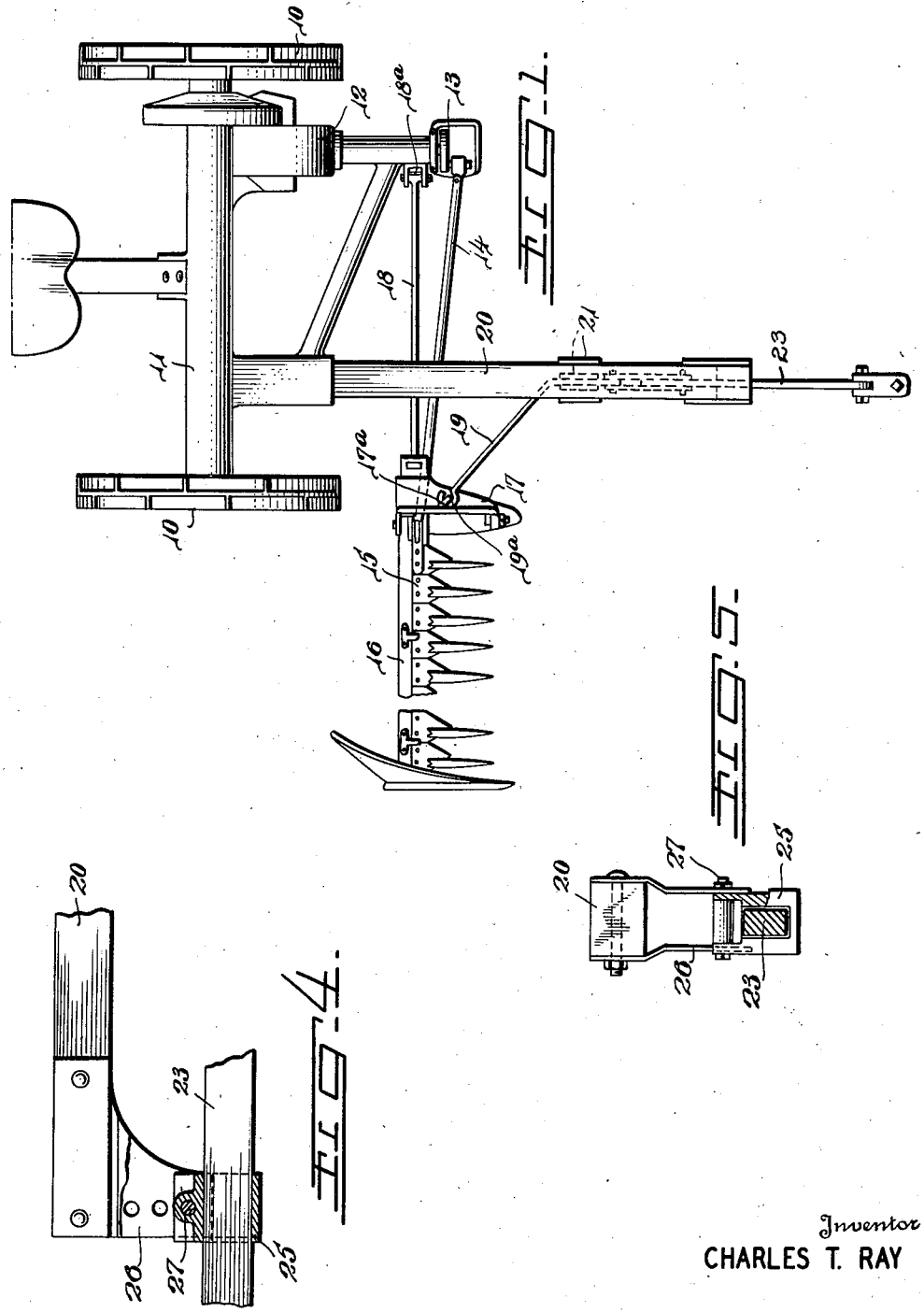
Inventor
CHARLES T. RAY
By Walter W. Burns.
Attorney June 16, 1942.  C. T. RAY  2,286,872
MOWER
Filed Jan. 11, 1941  3 Sheets-Sheet 2
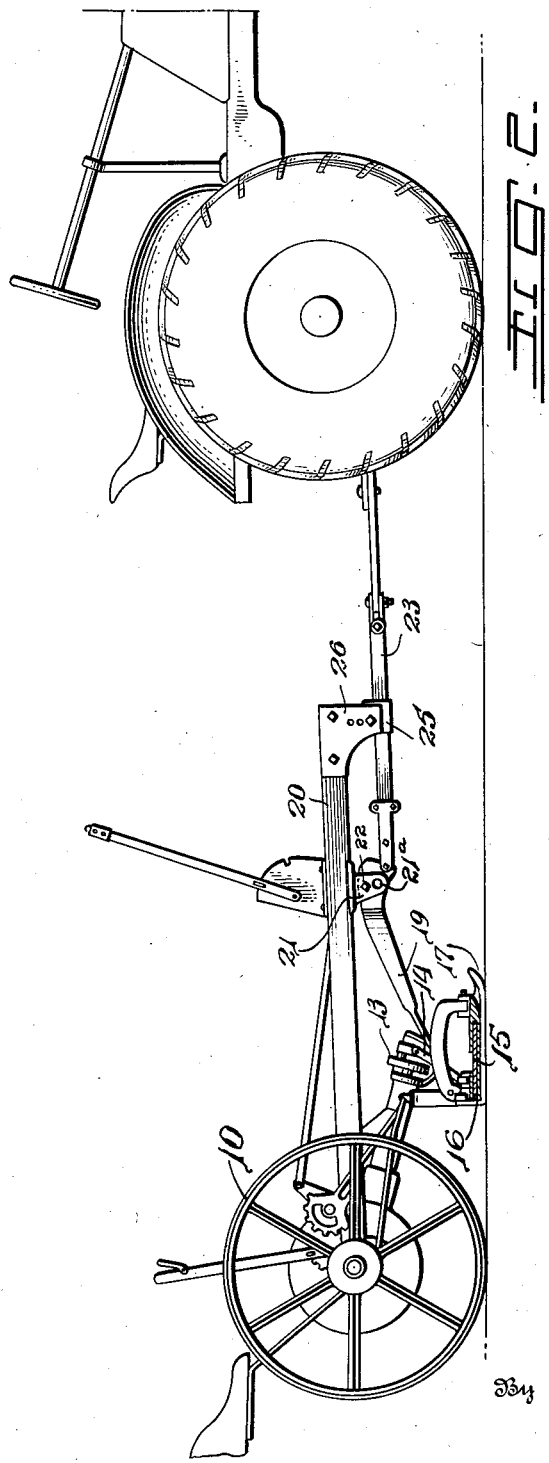
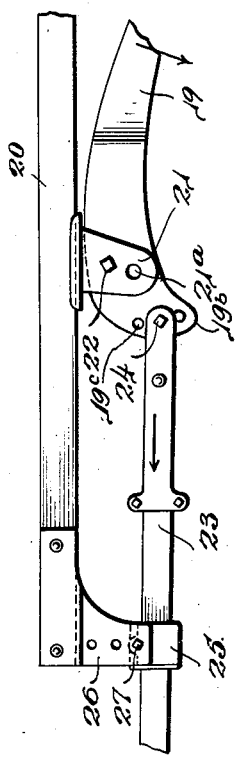
Inventor
CHARLES T. RAY
By Walter W. Burns
Attorney June 16, 1942. C. T. RAY 2,286,872
MOWER
Filed Jan. 11, 1941 3 Sheets-Sheet 3

Inventor
CHARLES T. RAY
By Walter W. Burns
Attorney

Patented June 16, 1942

2,286,872

UNITED STATES PATENT OFFICE 2,286,872

MOWER

Charles T. Ray, Louisville, Ky., assignor to B. F. Avery and Sons Company, Louisville, Ky., a corporation of Delaware Application January 11, 1941, Serial No. 374,128

8 Claims. (Cl. 56—272)

This invention relates to mowing machines and has particular relation to mowers wherein special means are provided to keep the cutter bar in proper relation to the ground.

During the mowing operation, if thick growth is encountered, the tendency is for the cutter bar to lift off the ground. This action causes the grass or other growth to be cut higher than is intended with a consequent loss.

The primary object of this invention is to produce an improved mowing machine construction.

Another object of the invention is the provision of an improved mower which when a thick growth is encountered, will force its cutter bar down and overcome any tendency of the thick growth to cause the cutter bar to lift itself because of the resistance to the operation of the reciprocating cutter.

A further object of the invention is the provision of a cutter which will have its draft device movable relative to the line of travel, be constrained to this line and cause the cutter bar to be forced downwardly in proportion to the resistance of the machine to forward movement.

A still further object of the invention is the provision of an improved mower construction wherein adjustable variable tension on a traction member, constrained to movement in the direction of travel, is transmitted to cause downward pressure at the inner end of the cutter bar.

Other and further objects will be apparent, to those skilled in the art, from a reading of the complete specification and claims.

Referring to the drawings wherein is illustrated my invention,

Fig. 1 is a plan view of the invention, parts being omitted for clearness.

Fig. 2 is a side view of the invention attached to a tractor, parts unnecessary to the illustration of the invention being omitted.

Fig. 3 is a detail side view of a portion of the draft means.

Figs. 4 and 5 are detail views of the forward portion of the traction device.

Fig. 6 is a perspective view of a mower with my invention applied thereto, the parts being in transport position.

Throughout the drawings and specification, the same reference characters refer to the same or similar parts.

Figure 9:
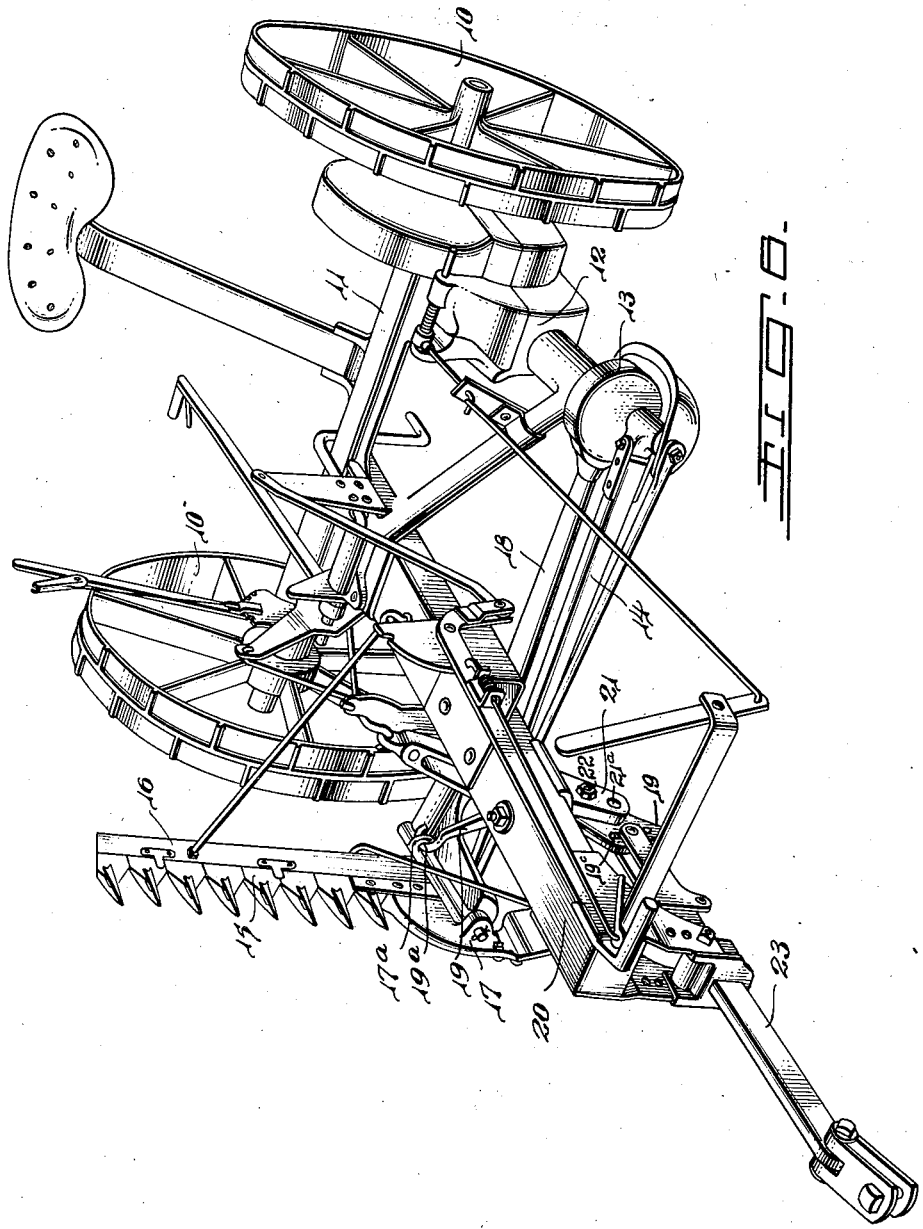

In the drawings the wheels 10 support the mower frame 11 and provide the power means for operation of the mower through the gearing in the housing 12. A pitman crank 13 operates a pitman 14 which reciprocates the knife and cutter blades 15 in the cutter bar 16 in a well known manner.

Secured to the inner shoe 17 of the cutter bar is a stabilizing bar 18 which is connected at its other end to the gear housing 12 in any suitable manner to have limited universal movement, as at 18a in order that it may swing to take the inequalities of the ground and be lifted from the ground when in transport position.

It will be observed that if pressure is exerted in a downward direction at any place on the stabilizing bar 18 or the cutter bar 16, any tendency to raise the cutter bar will be resisted. When cutting through thick grass or other material there is a tendency to lift the cutter off the ground. The mechanism which prevents this undesirable action will now be described.

Since any given pressure on the stabilizing bar 18 will have greater holding down action, the farther the point of application is from its pivot 18a and the greater will be its effectiveness, and since holding down the inner shoe 17 of the cutter bar 16 will hold it all down while cutting, it follows that the logical place for applying the pressure to hold the cutter down on the ground, is at the inner shoe 17. This mechanism will now be described.

An eye 17a has been constructed integral with the inner shoe 17 and has connected to it, the hook 19a which is at the end of and integral with the draft lever 19. This draft lever 19 is supported on the pole 20 by a pivot-supporting bracket 21 having a plurality of openings 21a as illustrated in Fig. 3. A pivot bolt 22 serves as a fulcrum for the draft lever 19 and may be placed in any one of the openings 21a provided to vary the height of the fulcrum of the lever 19. The pole 20 may be considered as a portion of the frame.

The forward end of the lever 19 is turned downwardly as shown at 19b in Fig. 3 and is provided with a plurality of holes 19c for connection to the hitch bar 23 which has an opening at its rear end for connection to the pivot pin 24 in one of the openings 19c. It will be here noted that movement of the hitch bar 23 in the direction of its arrow in Fig. 3 will have a tendency to force the draft lever 19 to rotate about the pivot pin 22 as indicated by its arrow in Fig. 3 the lever constituting a bell crank. It will also be noted that the lower the pivot pin 24 is set, the greater will be the offset distance of the axis of the hitch bar 23 from the pivot 22. The greater this distance the greater will be the leverage to force the opposite end 19a of the draft lever 19 downwardly.

In this manner, a forward pull on the hitch bar 23 causes a push downwardly on the draft lever 19 by the movement of the latter about the pivot pin 22.

Since the hook 19a at the rear end of the lever 19 is connected to the eye 17a integral with the inner shoe 17, downward movement of the lever hook 19a will push the shoe 17 closer to the ground.

In order to make the pull on the hitch bar 23 straight on the draft lever 19 and offset the side draft of the cutter bar because of its off-set position relative to the line of draft, there is provided a guide 25 having an opening slightly larger than the hitch bar 23 to permit free movement of the latter during operation. The guide 25 is pivotally supported on the bracket 26 by the pivot pin 27. The bracket 26 is suitably secured to the pole 20.

In the operation of this invention, the traction on the hitch bar 23 is transmitted through the lever 19 and the bracket 21 to the pole 20 and thence to the frame 10 to pull the mower forward.

In addition, the force of the pull in the hitch bar 23 causes a downward pressure on the shoe 17 through the lever 19. By setting the connecting pivot pin 24 lower on the forward arm of the draft lever 19, the leverage of the lever 19 is increased and the pressure downwardly on the inner shoe is increased. By raising the connecting pin 24, the leverage is decreased and the downward pressure on the inner shoe 17 is decreased.

The adjustment of the fulcrum pin 22 in another opening in the bracket 21 will change the height of the outer end of the pole 20 and slightly change the leverage of the draft lever 19 and the downward pressure on the inner shoe 17.

The pivots between the parts having been set to produce the desired predetermined pressure of the lever 19 on the inner shoe 17, changes in mowing conditions which would tend to change the level of the inner shoe 17 relative to the ground, cause other conditions to change which offset the tendency of the inner shoe to lift and the inner shoe is kept at substantially the same predetermined pressure on the ground.

For example, suppose there is an abundant growth of alfalfa which is met by the cutter bar. The tendency of the cutter bar to pull back also tends to cause it to lift off the ground. But the reaction tending to hold the cutter and machine back also causes an immediate greater pull on the hitch bar 23. This, in turn, causes downward pressure of the rear end of the draft lever 19 which neutralizes immediately the tendency of the cutter to rise. While this action is taking place, the pressure of the inner shoe on the ground remains the same—according to the settings of the fulcrum pins 22 and 24.

At the same time, the whole draft is taken by the hitch bar 23 which moves backward and forward in the guide 25, this bar 23, at all times taking the side draft of the cutter bar, the fulcrum pin 27 of the guide 25 providing for any slight change in angularity between the hitch bar 23 and the pole 20. This hitch bar 23 and its guide 25 also insure a straight constant-angle pull on the lever 19, thus maintaining constant pull for any given set of conditions.

During the mowing operation, the cutter bar with its inner and outer shoes in contact with the ground and the lever 19 reacting against backward pull, is able to rise and fall over the inequalities in the surface of the ground, still maintaining its resilient contact.

While I have shown and described an embodiment of my invention, in detail, it is to be understood that the disclosure is merely illustrative and that modifications and changes may be made without departing from the spirit of the invention and within its scope as claimed.

Having described my invention, what I claim is:

1. A mower comprising a frame, a cutter bar, a draft means, means for connecting the draft means to the frame to constrain its movement to the line of draft means connecting the draft means and the cutter bar to place a downward pressure on the cutter bar, and means acting to divide the draft force between said connecting means when force is applied to the draft means in the line of draft.

2. A mower comprising a frame, a cutter bar, a draft means, means for connecting the draft means to the frame to constrain its movement to the line of draft, means connecting the draft means and cutter bar, means acting to divide the draft force between said connections to place a predetermined pressure on the cutter bar relative to the force applied to the draft means in the line of draft, and means to adjust the ratio of the divided draft force.

3. A mower comprising a frame, a cutter bar, a bell-crank lever pivotally supported by the frame, one arm of the crank being attached to the cutter bar for downward pressure thereon, draft means connected to the other arm for pressure of the first arm on the cutter bar when draft force is applied and means for guiding the movement of the draft means to constrain its movement parallel to the line of travel of the mower.

4. A mower comprising a cutter bar, a draft pole, draft means movably associated with the draft pole, bell-crank lever means pivoted on the draft pole, one arm of the lever means being attached to the cutter bar and the other to the draft means and means on the draft pole to hold the draft means in substantially parallel relation thereto and confining its movement to the line of draft.

5. A mower comprising a cutter bar, a draft pole, draft means on the draft pole, a bell-crank lever fulcrumed on the draft pole one arm of the lever extending sidewise and downwardly to the cutter bar, means for connecting said arm to the cutter bar, means for connecting the draft means to the other arm of the lever and means on the draft pole to hold the draft means in substantially parallel relation to the pole and confining its movement to the line of draft.

6. A mower comprising a frame, a cutter bar, a lever of the first class pivotally supported by the frame, one arm of the lever being connected to the cutter bar for downward pressure thereon, draft means pivotally connected to the other arm causing pressure of the first arm on the cutter bar when draft force is applied, means to adjust said pivotal connection to vary the downward pressure relative to the draft force and means for guiding the movement of the draft means to constrain its movement parallel to the line of travel of the mower.

7. A mower comprising a frame, a cutter bar, a draft means, means connecting the draft means to the frame to constrain its movement to the line of draft, lever means of the first class having an arm connected to the draft means, and means connecting the remaining arm of the lever means and the inner end of the cutter bar to place a downward pressure on the cutter bar inner end when force is applied to the draft means in the line of draft.

8. A mower comprising a frame, a cutting mechanism including a swinging member pivotally connected to the frame and a cutter bar pivoted at its inner end to the swinging member, a draft means, means for connecting the draft means to the frame to constrain its movement to the line of draft and means including a lever of the first class connected at its respective arms to the draft means and to the cutting mechanism adjacent the cutter bar pivot to place a downward pressure on the cutter bar inner end when force is applied to the draft means in the line of draft.

CHARLES T. RAY.